(12) United States Patent
Griff et al.

(10) Patent No.: US 8,832,258 B2
(45) Date of Patent: Sep. 9, 2014

(54) SERVER DEVICE AND METHOD FOR DIRECTING MOBILE DEVICES TO COLLECT AND COMMUNICATE LOCATION BASED USER QUALITY DATA

(75) Inventors: Paul Griff, Bellevue, WA (US); Ron Dicklin, Kirkland, WA (US); Jason Browne, San Mateo, CA (US)

(73) Assignee: Root Wireless, Inc., Bellevue, WA (US)

( * ) Notice: Subject to any disclaimer, the term of this patent is extended or adjusted under 35 U.S.C. 154(b) by 508 days.

(21) Appl. No.: 12/574,643

(22) Filed: Oct. 6, 2009

(65) Prior Publication Data
US 2010/0094930 A1 Apr. 15, 2010

Related U.S. Application Data

(60) Provisional application No. 61/103,160, filed on Oct. 6, 2008.

(51) Int. Cl.
*G06F 15/173* (2006.01)
*H04W 24/10* (2009.01)
*H04W 24/08* (2009.01)

(52) U.S. Cl.
CPC ................. *H04W 24/10* (2013.01); *H04W 24/08* (2013.01)
USPC ..... 709/224; 709/203; 455/456.1; 455/67.11; 455/423; 455/425; 370/252

(58) Field of Classification Search
None
See application file for complete search history.

(56) References Cited

U.S. PATENT DOCUMENTS

| | | | |
|---|---|---|---|
| 6,366,780 B1 * | 4/2002 | Obhan | 455/453 |
| 6,516,189 B1 | 2/2003 | Frangione et al. | |
| 6,560,442 B1 * | 5/2003 | Yost et al. | 455/423 |
| 6,745,011 B1 | 6/2004 | Hendrickson et al. | |
| 6,754,470 B2 | 6/2004 | Hendrickson et al. | |
| 6,757,543 B2 * | 6/2004 | Moran et al. | 455/456.1 |
| 6,788,926 B1 | 9/2004 | Frangione et al. | |
| 6,807,515 B2 | 10/2004 | Vogel et al. | |
| 6,928,280 B1 | 8/2005 | Xanthos et al. | |
| 7,013,136 B2 | 3/2006 | Frangione et al. | |
| 7,209,710 B2 * | 4/2007 | Burch et al. | 455/67.11 |
| 7,295,119 B2 * | 11/2007 | Rappaport et al. | 340/572.4 |
| 7,299,277 B1 * | 11/2007 | Moran et al. | 709/224 |
| 7,315,739 B2 * | 1/2008 | Burch et al. | 455/420 |
| 7,392,017 B2 | 6/2008 | Chu et al. | |
| 8,489,669 B2 * | 7/2013 | Johnson | 709/203 |
| 2002/0069037 A1 | 6/2002 | Hendrickson et al. | 702/186 |
| 2005/0182847 A1 | 8/2005 | Jawad Pirzada et al. | 709/233 |
| 2006/0007870 A1 * | 1/2006 | Roskowski et al. | 370/252 |
| 2006/0294260 A1 | 12/2006 | Young et al. | |
| 2008/0031277 A1 | 2/2008 | Walter et al. | |
| 2009/0138427 A1 * | 5/2009 | Kalavade | 707/1 |
| 2009/0195377 A1 | 8/2009 | Chang | |
| 2009/0233611 A1 | 9/2009 | Olsson et al. | 455/446 |
| 2009/0310501 A1 * | 12/2009 | Catovic et al. | 370/252 |
| 2010/0087188 A1 | 4/2010 | Griff et al. | 455/424 |
| 2010/0091677 A1 | 4/2010 | Griff et al. | 370/252 |
| 2010/0105377 A1 * | 4/2010 | Iwamura et al. | 455/424 |
| 2010/0248640 A1 * | 9/2010 | MacNaughtan et al. | 455/67.11 |

(Continued)

*Primary Examiner* — Greg C Bengzon
(74) *Attorney, Agent, or Firm* — Seed IP Law Group PLLC

(57) ABSTRACT

A computing server directs a mobile device to collect and communicate realistic and accurate user quality information according to a data collection rule. The computing server receives, filters, and stores the user quality information in a database. The computing server processes the data and communicates the data to a web-server.

20 Claims, 6 Drawing Sheets

(56) References Cited

U.S. PATENT DOCUMENTS

| | | | |
|---|---|---|---|
| 2011/0044193 A1* | 2/2011 | Forenza et al. | 370/252 |
| 2011/0106942 A1* | 5/2011 | Roskowski et al. | 709/224 |
| 2011/0205910 A1* | 8/2011 | Soomro et al. | 370/252 |
| 2013/0242776 A1* | 9/2013 | Kazmi et al. | 370/252 |

* cited by examiner

SERVER DEVICE AND METHOD FOR DIRECTING MOBILE DEVICES TO COLLECT AND COMMUNICATE LOCATION BASED USER QUALITY DATA

CROSS-REFERENCE TO RELATED APPLICATION

This application claims the benefit under 35 U.S.C. §119(e) of U.S. Provisional Patent Application No. 61/103,160 filed Oct. 6, 2008, where this provisional application is incorporated herein by reference in its entirety.

BACKGROUND

1. Technical Field

Embodiments of server devices disclosed herein relate to a computing server useful for directing one or more mobile devices to collect data related to the performance quality of a communication network and to provide the data to the server. The server devices process data collected from mobile devices and communicate the data to a server for presentation.

2. Description of the Related Art

Wireless network providers conventionally use relatively complex, expensive, private and inflexible methods for collecting information about the quality of their wireless network. More particularly, network providers use large vehicles outfitted with special equipment connected to groups of mobile phones and specialized network monitoring analyzers The data collected by network providers generally does not reflect a true user experience. Frequently, the data collected is theoretical data. In other cases, instead of true user data, the collected data is at best a representation of the results of particular tests executed by the test operator. In addition, the test equipment used is specialized for performing the tests specified by the network provider, and the collected data is often very complex. The resulting complex test information is often not available to the end user or to the general public.

BRIEF SUMMARY

A computing server that directs a mobile device to collect and communicate realistic and accurate user quality information according to a data collection rule is disclosed. The computing server receives, filters, and stores the user quality information in a database. The computing server processes the data and communicates the data to a web-server. According to one embodiment, the computing server has a central processing unit (CPU), a communication transceiver, and a memory. The memory has software, which is executable by the CPU. The server is operable to identify a mobile computing device that is operating within a wireless network and that is executing a data collection software program.

A data collection rule is communicated to the mobile computing device. The communicated rule is one from a set of data collection rules. The set of rules includes a cell tower list rule which directs the mobile computing device to store user experience data when the mobile computing device is communicating with a predetermined cell tower identified in a list of cell towers included as part of the cell tower list rule. The set of rules further includes a data speed test frequency rule which directs the mobile computing device to store a plurality of data speed measurements having a predetermined time pass between the data speed measurements. The set of rules further includes a data latency test frequency rule which directs the mobile computing device to store a plurality of data latency measurements having a predetermined time pass between the data latency measurements. The time between the measurements is communicated as part of the data speed test frequency rule and as part of the data latency test frequency rule.

The computing server is operable to receive user experience data from the mobile computing device, partition the user experience data into data-type categories, and translate the data-type categories into database column groups. The computing server is further operable to filter the user experience data by testing and removing data according to predetermined criteria, store the filtered user experience data in a database, group a plurality of filtered user experience data points together into a single data metric, and communicate the data metric to a web-server.

According to one embodiment, a method for collecting and processing wireless network user quality data is taught. The method includes the step of identifying a mobile computing device operating within a wireless network that is executing a wireless network user quality data collection software program. The method also includes the steps of communicating at least one configuration datum to the mobile computing device and receiving at least one wireless network user quality data measurement from the mobile computing device. The configuration datum directs the mobile computing device to perform a wireless network user quality data collection operation. According to another embodiment, computer readable medium has content that configures the mobile computing device to perform the steps.

According to one embodiment, a computing server has a central processing unit (CPU), a communication transceiver, and a memory, which stores software. The software is executable by the CPU and operable to identify a mobile computing device operating within a wireless network, direct, via the communication transceiver, the mobile computing device to perform a wireless network user quality data collection operation, and parse received wireless network user quality data from the mobile computing device into a user quality data point. The identified mobile computing device in this embodiment is executing a data collection software program.

According to one embodiment, a system for collecting wireless network user quality data is taught. The system has a computing server configured to direct wireless network user quality data collection operations to a mobile device, and the mobile device is provisioned for typical operation on a wireless communication network. The system also has a memory associated with the computing server, which is configured to store a software program. The software program is capable of instructing the server to communicate a direction to the mobile device to perform at least one wireless network user quality data collection operation, buffer the wireless network performance data collected according to the direction, and parse the collected wireless network performance data.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
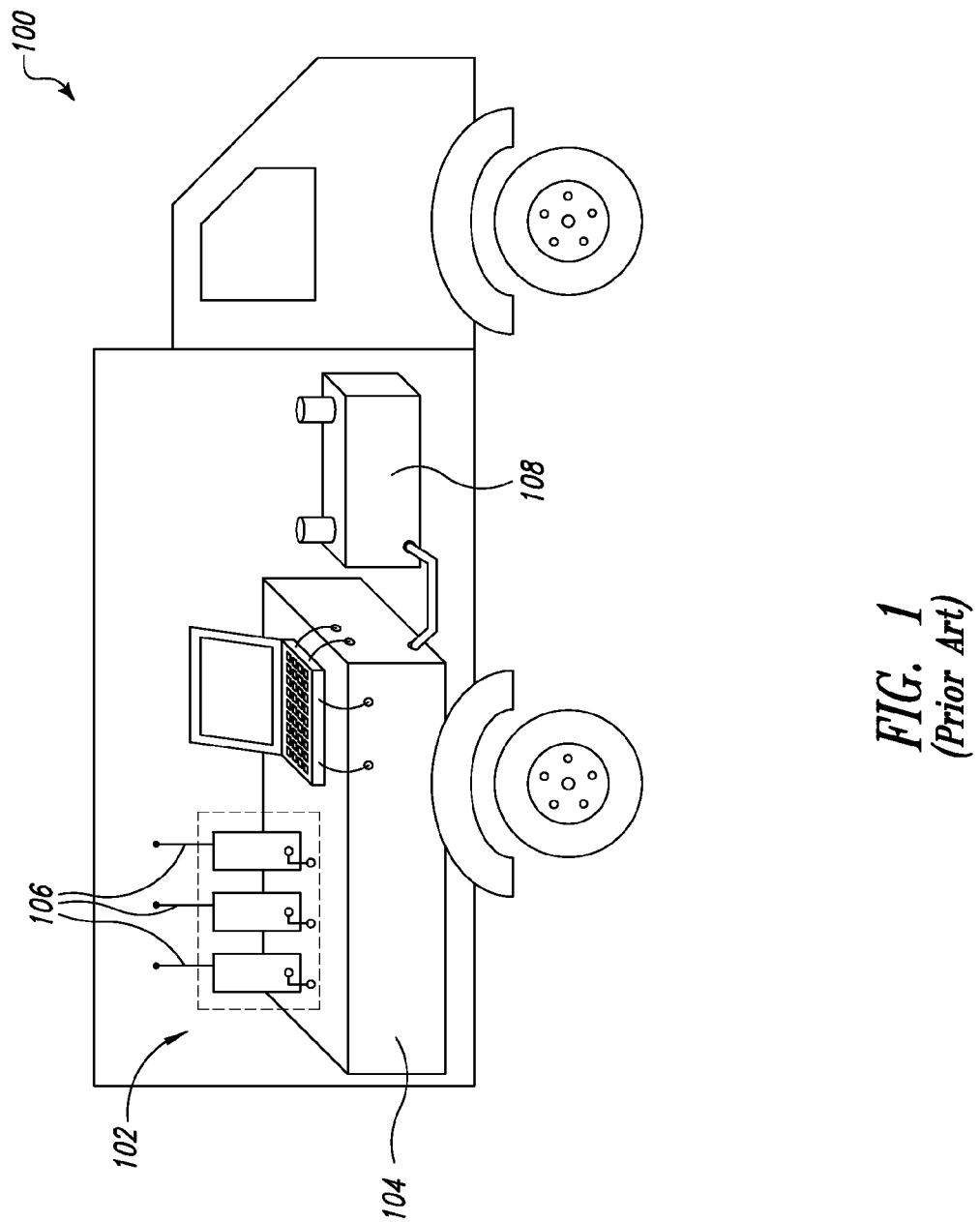
FIG. 1 illustrates a data gathering system conventionally used in prior art to collect communication network performance data.

People use mobile communication devices for business, pleasure, safety, and many other reasons. Many conventional mobile devices are used both for voice communications as well as for data communications. For example, people use their mobile devices to talk to other people, to interact with Internet web pages on mobile devices, to send and receive text messages, to receive geographical positioning information, and many other things. Accordingly, the quality of the wireless network connection and usability of the mobile device are very important to people.

The people that use mobile communication devices refer to the underlying telecommunications network with a wide variety of names. For example, the wireless communication network referenced herein may alternatively be known as a wireless network, a cellular network, a mobile network, and any combination of same or similar words. The term network as used herein is intended to broadly encompass any wireless communications network.

The operators of the wireless communications network permit some mobile devices to access and communicate over the wireless communications network. Generally, users of mobile devices pay the operators for using the wireless communications network. The operators are referenced herein as including network providers, service providers, owners, carriers, and any combination of same or similar words.

The users of mobile devices that communicate via the wireless communications network include individuals and other computing devices. The mobile devices and users of the mobile devices are interchangeably be referenced herein as users, mobile devices, clients, cell phones, and any combination of same or similar words.

One quality of the wireless connection is the network signal strength in a particular geographical area. This quality is a factor that directly affects the perceived usefulness, efficiency, and overall wireless network experience provided by the mobile device. In some cases, people inconveniently alter their schedules and their locations particularly to improve their wireless network experience. Accordingly, some mobile devices have some type of 'signal strength' indicator, and wireless network providers use this to try to differentiate their quality of service from that of their competitors.

Other factors that affect a user's perception of quality include battery life, audio quality, propensity of the device to drop calls, ability to make and receive calls in remote and/or densely urban areas, accessibility to data services, technology level of data services, and the like. In many cases, the user determines the likelihood of being satisfied in these factors based on the signal strength indicator regardless of whether or not the indicator has any relation to the factors.

Wireless network providers collect data for many reasons. One reason is to generate tangible results to support their 'quality of service' marketing efforts. The data collected by the network providers is typically complex and not readily available to consumers. In some cases, the data collected by the network providers is merely theoretical, and in other cases, the data is gathered with specialized test equipment.

Wireless network operators usually display their theoretical and/or gathered quality information in simplified form on graphical maps. The graphical maps are often only found on the particular network carrier's website. The graphical maps are marketing tools for the network carrier. The graphical maps are often simplified to provide to users an understanding or estimate of how the operator's network may perform at a particular location. In some cases the limited information is merely signal strength and/or a listing of the type of data connections that are made available. In other cases, there is even less information.

FIG. 1 illustrates a data gathering system 100 conventionally used to collect communication network performance data. The system 100 generally comprises a large vehicle, such as a van or truck, carrying a collection of test equipment. Several wireless devices 102 are coupled to electronic data collection devices 104. Respective antennas 106 are tuned in various configurations and also coupled to wireless devices 102 or the electronic data collection devices 104. The antennas 106 are operable to transmit and/or receive communication signals from one or more wireless communication networks. A power source 108 is used as a power supply for all of the test equipment.

In some cases, the wireless devices 102 are generally available, retail cellular phones, and at least some of the retail cellular phones may be configured with specific a software program added for the test operator. In such cases, the software program is custom designed and operable to execute a particular test desired by the test operator. For example, the program may put the cellular phone in a predetermined state, which facilitates testing. Even in these cases, however, the mobile devices have nevertheless been customized specifically for the industrialized testing environment of data gathering system 100.

In other cases, the wireless devices 102 are customized wireless equipment specifically used to facilitate testing. These wireless devices may have electronic hardware and software used to transmit known signal patterns, receive particular frequencies, and collect specific wireless communication network data.

The power source 108 in the data gathering system 100 is supplied by the on-board vehicle power system and is used to supply power for all of the system 100 test equipment. The vehicle's DC power is tapped and isolated to be a test equipment power source for power source 108. The test equipment power source provides one or more power supplies for individual pieces of test equipment. The supplies are stepped up or down as necessary and regulated for each of the test equipment devices. In some cases, one of the individual supplies is further modified from a DC power source to provide AC power for conventional 110 VAC test equipment.

The purpose of the conventional power source 108 is to provide an unlimited supply of power to satisfy the demands of the test equipment. The conventional data gathering system 100 is not concerned with power saving or power consumption and so in the conventional data gathering system 100, power measurement factors are not considered. Since power supply is not one of the variables to be tested, efforts are made to make it as constant as possible. It is designed in the data gathering system 100 for power source 108 to be an unseen, unnoticed part of the test equipment.

Figure 2:
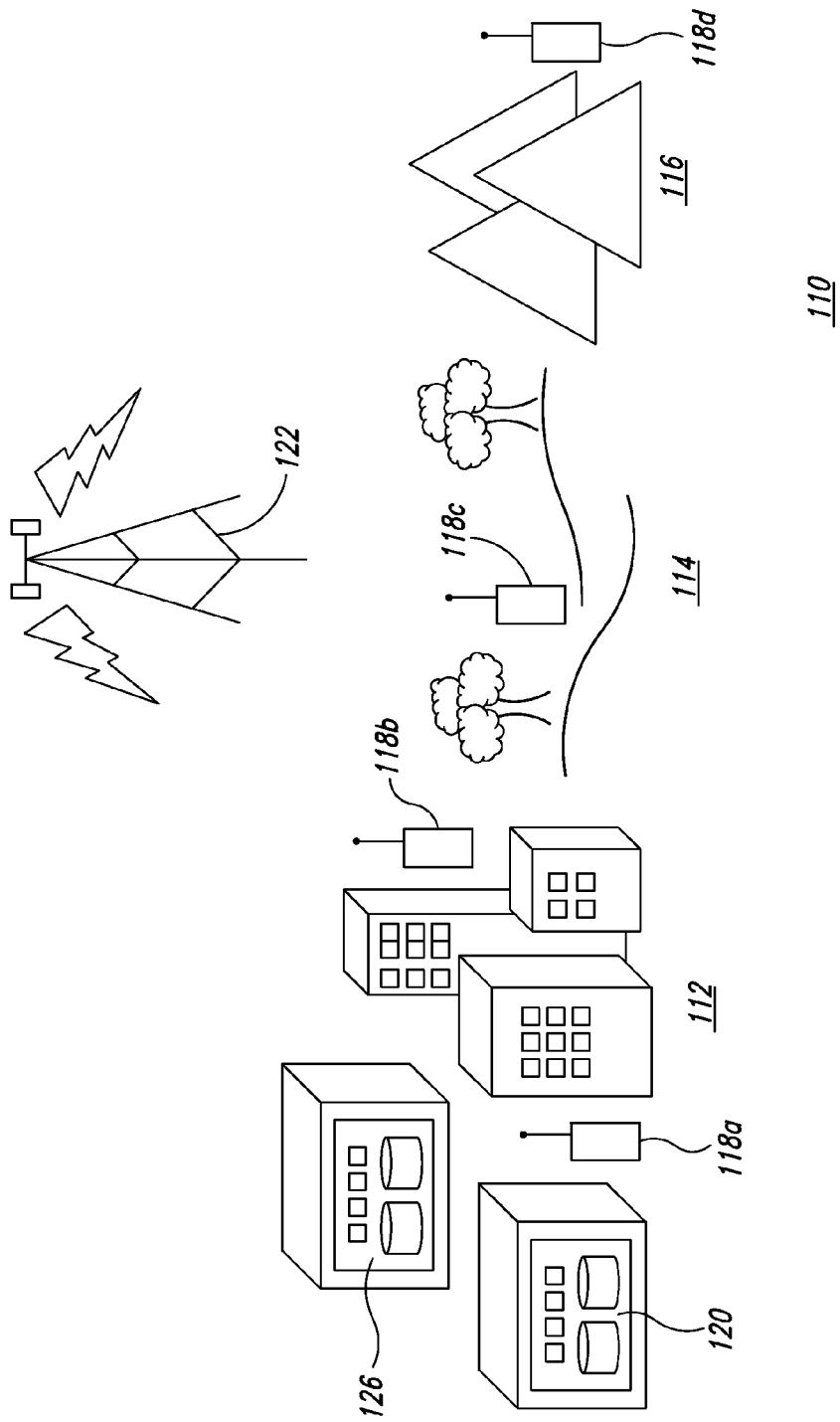
FIG. 2 illustrates one embodiment of a wireless network performance measurement system according to the present invention.

FIG. 2 illustrates a new wireless network performance measurement system 110. Metropolitan areas 112, rural areas 114, and mountainous areas 116, are among the many areas where consumers use wireless communication devices. A cellular communication network 122 provides cellular service to each of these areas, albeit with widely differing quality. That is, to some degree, every area served by cellular network 122 is subject to low signal strength, sporadic network outages, poor communication quality, dropped calls, and a host of other problems broadly identified as "low user quality."

Cellular communication network 122 may be any available network suitable for transmitting and receiving data between mobile and/or fixed point devices, or the cellular network 122 may be dedicated to a primary purpose of delivering the information to known subscribers. Cellular communication network 122 may include both wired and wireless infrastructure; for example, transceivers, repeaters, switches, antennas, routers, public switched telephone networks, codecs, multiplexers, de-multiplexers, and the like.

Often, but not always, the hardware used to implement a particular network 122 is dedicated to a particular type of wireless network technology. For example, some technologies include Global System for Mobile Communications (GSM), General Packet Radio Service (GPRS), Enhanced Data Rates for GSM Evolution (EDGE), Code Division Multiple Access (CDMA), Universal Mobile Telecommunication System (UMTS) High Speed Downlink Packet Access (HSDPA), Evolution-Data Optimized (EV-DO), integrated Digital Enhanced Network (iDEN), Worldwide Interoperability for Microwave Access (WiMax), various 802.11 standards (WiFi), femtocells, satellite-based communications, and many others now or later developed. These technologies may share components or they may have infrastructure dedicated to their type of technology. The combination of each of the elements of the wireless network contributes to the quality or lack of quality of the wireless network 122.

Dispersed throughout the metropolitan, rural, and mountainous areas 112-116, a plurality of individual mobile devices 118a-d are operated in a manner typified by an average cellular service customer having access to contracted wireless network services. In some cases, the cellular service customer is an individual user, and in other cases, the customer is a business entity that provides the mobile device to a representative. In either case, the mobile devices 118a-d are provisioned for typical operation on a wireless communication network.

Each of the identified mobile devices 118a-d of FIG. 2 is outfitted with a software program used to collect selected cellular network, geographical, and device test data. Data collection by the mobile devices 118a-d is directed by a server 120 in a central office.

The central office may have one or more servers 120. In some cases, several servers 120 are used to provide redundant operations, which improve the robustness of the data gathering operation. In some cases, several servers 120 are used to communicate with a large number of mobile devices 118a-d. Additionally, the one or more central offices may be located in dense, urban locations or in remote, rural locations.

Server 120 sends wireless communication instructions to the mobile devices 118a-d directing each device to collect and transmit test data back to the central office server 120. Embodiments of mobile devices 118a-d are disclosed in U.S. Provisional Patent Application bearing No. 61/103,174, filed Oct. 6, 2008 and a corresponding U.S. Utility patent application, filed Oct. 6, 2009, each entitled "MOBILE DEVICE AND METHOD FOR COLLECTING LOCATION BASED USER QUALITY DATA," and each naming each of the inventors of the present application, filed concurrently and incorporated by reference in their entirety.

Server 120 processes data received from mobile devices 118a-d and communicates the processed data to a web server 126. The web server hosts a web page that presents the processed data to viewers that access the web page. In some cases, web server 126 provides a dashboard application that permits interactive control in any type of network environment. Embodiments of web server 126 are disclosed in a U.S. Provisional Patent Application bearing No. 61/103,141, filed Oct. 6, 2008 and a corresponding U.S. Utility patent application, filed Oct. 6, 2009, each entitled "WEB SERVER AND METHOD FOR HOSTING A WEB PAGE FOR PRESENTING LOCATION BASED USER QUALITY DATA RELATED TO A COMMUNICATION NETWORK," and each naming each of the inventors of the present application, filed concurrently and incorporated by reference in their entirety.

Figure 3:
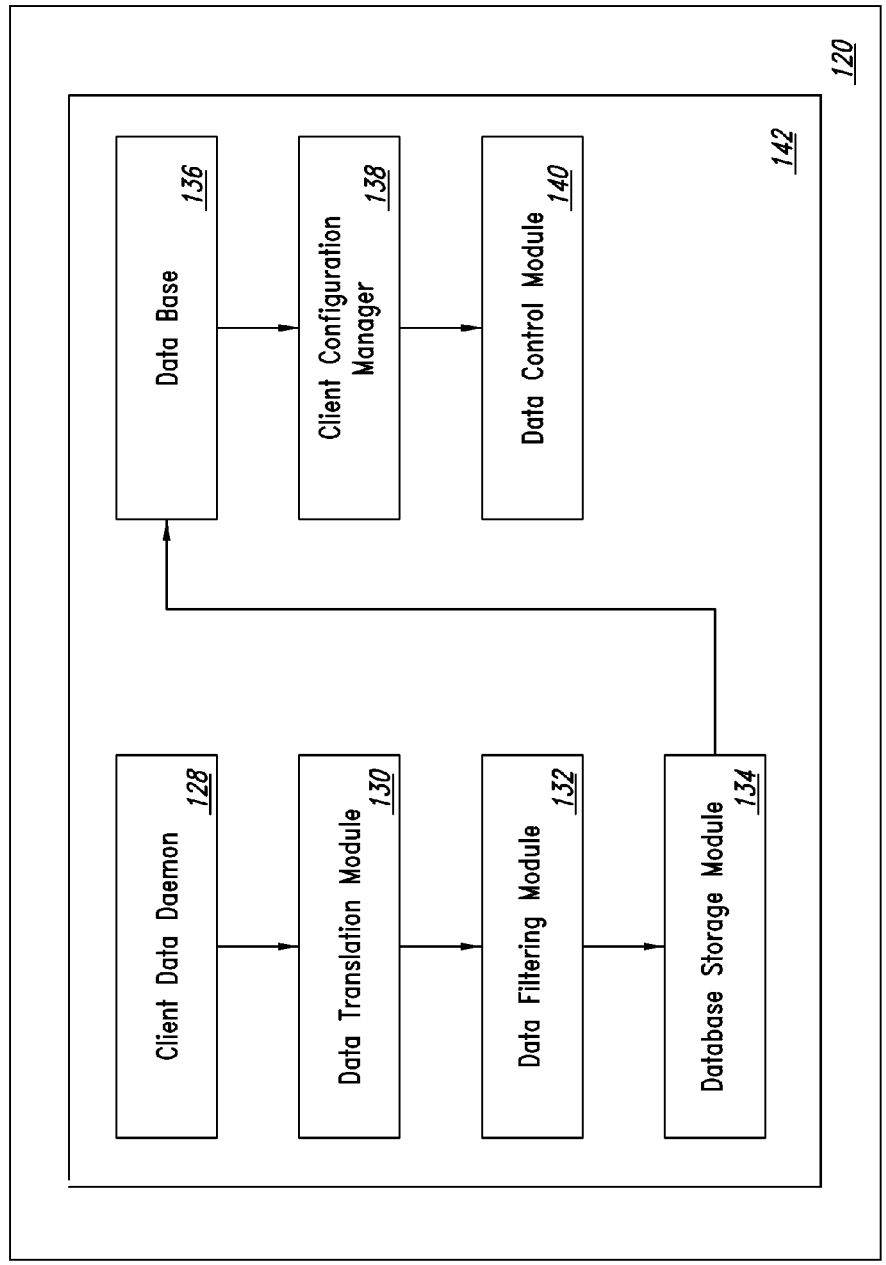
FIG. 3 illustrates portions of a non-limiting embodiment of a server 120 of FIG. 2.

FIG. 3 illustrates portions of a non-limiting embodiment of a server 120 of FIG. 2. Server 120 is a computing server that includes operative hardware found in a conventional computing server apparatus such as one or more central processing units (CPU's), volatile and non-volatile memory, serial and parallel input/output (I/O) circuitry compliant with various standards and protocols, wired and/or wireless networking circuitry (e.g., a communications transceiver).

As known by one skilled in the art, the a server 120 has one or more memories 142, each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory.

Server 120 further includes operative software found in a conventional computing server such as an operating system, software drivers to direct operations through the I/O circuitry, networking circuitry, and other peripheral component circuitry. In addition, server 120 includes operative application software such as network software for communicating with other computing devices, database software for building and maintaining databases, and task management software for distributing the communication and/or operational workload amongst various CPU's. In some cases, server 120 is a single hardware machine having the hardware and software listed herein, and in other cases, server 120 is a networked collection of hardware and software machines working together in a server farm to execute the functions of the wireless network performance measurement system 110. The conventional hardware and software of server 120 is not shown in FIG. 3 for simplicity.

FIG. 3 illustrates software components loaded into the memory 142 of server 120. The memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like.

A client data daemon 128, a data translation module 130, a data filtering module 132 and a database storage module 134 are programmatic applications that operatively work together to analyze and process data recorded in the wireless network performance measurement system 110. A database 136 is used to store raw and processed data.

Database 136 may be a traditional database, one or more database systems, a file system, or any other method known in the art for storing such information, or any combination of the above, including implementation using distributed computing techniques.

A client configuration manager 138 configures software running on one or more mobile devices 118*a-d* within the wireless network performance measurement system 110. For example, the software running a mobile device, 118*a-d* is a wireless network user quality data collection software program. A data control module 140 processes raw data from the mobile devices 118*a-d* and distributes the raw data to the programmatic applications.

In a preferred embodiment, server 120 sends data to and receives data from a large number of mobile devices 118*a-d*. Server 120 processes and stores location based mobile device user experience data received from the mobile devices 118*a-d*. After storage of the processed user experience data, the wireless network user quality data measurements (e.g., the data) are made available to additional servers, for example web server 126 (FIG. 2), for presentation to consumers. In such an embodiment, the remote computing device (e.g., web server 126) makes requests for particular data. The server 120 responds to the requests by providing or otherwise permitting access to the data.

In another preferred embodiment, a unique user location profile may be generated for one or more mobile devices 118*a-d* operating in a wireless network performance measurement system 110. For example, each mobile device identified by server 120 may be given a unique identifier. The unique identifier may be random number, an Electronic Serial Number (ESN), an International Mobile Equipment Identifier (IMEI), or some other number. In many cases, the number is encrypted. After generating the unique identifier, the identifier may be combined with typical, repeated geographic and time information to create the unique user location profile.

After a user location profile is generated for a mobile device 118*a-d*, the profile is available for use by server 120 to collect particular data at particular times and in particular locations. In some cases, server 120 can use the profile in a predictive manner, and in other cases, server 120 can use the profile to make decisions about data retrieval from particular mobile devices 118*a-d*.

For example, in order to collect data only in certain locations and as infrequently as possible, server 120 may actively monitor how many mobile devices 118*a-d* are currently in, or predicted to be, in a particular geographic area or sector during a particular time window. Server 120 may further monitor which sectors have outdated or otherwise insufficient data. Server 120 may increase or decrease the frequency of data collection of a mobile device 118*a-d* (e.g., using a user location profile) based on the age, quality, or volume of data previously gathered. Software in the mobile device 118*a-d* is responsive to the requests for data of server 120.

In another example, when the wireless network performance measurement system 110 is initialized in a new geographical area, the number of data collection mobile devices 118*a-d* may be small. In such circumstances, the server may collect large amounts of data from each mobile device 118*a-d* in the entire area. Performance and power considerations are considered for each mobile device 118*a-d*, so server 120 may only request data in certain areas of interest, and server 120 may function to prevent or minimize the collection of data in overlapping areas. That is, in areas where there are few mobile device clients 118*a-d*, the mobile device client may be requested to collect data with greater frequency only in areas where server 120 does not currently have data.

Alternatively, server 120 may reduce or suspend requests for data in areas where server 120 does not currently have data. In other cases, server 120 may request data based on one set of parameters, but software of mobile device 118*a-d* may decide locally whether and how to respond to the request based on a local set of parameters. For example parameters that the mobile device 118*a-d* may use to decide whether and how to respond include current battery life, current processor utilization, scheduled events, and the like.

The software in the server 210 may also modify its request for data based on the results of the data.

As examples, if the returned data shows that particular ones of the mobile devices 118*a-d* are nearly always plugged in to a separate power and supply and not usually batter powered, the server may send signals to more frequently use these mobile devices 118 for high power system checks, such as GPS sensing, antenna power consumption, or the like. Similarly, if the server sees that some of the mobile devices 118 are rarely used and have a wide available bandwidth in the CPU and also for transmitting and receiving, it may request additional tests or more immediate responses from such mobile devices 118. Alternatively, if the test results indicate rapid battery depletion, then the server can modify the commands it sends to reduce the battery usage and conduct fewer tests or only low power tests.

In some cases, the wireless network performance measurement system 110 is initialized or operating in a geographical area where the number of data collection mobile devices 118*a-d* is large, e.g., 5000 or more devices. In such cases, server 120 may further function to adjust the frequency and/or volume of data collection by a particular mobile device 118*a-d*. For example, rather than collecting data from every device, server 120 may collect data from only some devices and use techniques such as statistical modeling, to create a complete set of wireless network performance data. As another example, server 120 may direct some mobile devices 118*a-d* to collect data of one type and direct other mobile devices 118*a-d* to collect data of another type. The wide range of data collection directions provided by server 120 in a geographical area having many mobile devices 118*a-d* reduces the demand for power due to data collection on each mobile device 118*a-d*.

Another technique that may be used by server 120 to direct data collection only in certain locations and as infrequently as possible is to take advantage of location based services on the mobile device 118*a-d*. For example, a global positioning system (GPS) is available on some mobile devices 118*a-d*. Operating the GPS circuitry, however, uses a large amount of power on most devices. Accordingly, it is desired to collect GPS data only when mobile device 118*a-d* has changed location by a large distance or is plugged in. For example, the server 120 can send a software command to update the GPS location only after the mobile device 118 has been plugged into a power supply for a sufficient time to charge the battery.

One technique used to minimize the frequency of GPS driven data collection is to take advantage of the cellular network's capability to provide the distance of the mobile device 118*a-d* from the closest cellular tower or any other cellular tower. The cellular tower information, e.g., the distance, is collected by the radio hardware in the mobile device 118*a-d*. This distance data is independently updated by the radio module on the mobile device 118*a-d* even in a power saving mode. By monitoring the distance, the mobile device 118*a-d* can determine when it has moved from a particular position by a predetermined amount, e.g., 30 meters.

Using the distance information from the cellular tower, server 120 can direct whether or not the GPS module of the mobile device 118*a-d* needs to be engaged. For example, if the distance to the closest cellular tower has not appreciably changed, then the mobile device 118*a-d* may not be directed to capture new GPS coordinates and new network performance data.

The Client Data Daemon 128 (CDD) of server 120 is the subcomponent responsible for communicating with mobile devices 118*a-d*. A low level proprietary protocol is used to facilitate communication between the CDD 128 and each mobile device 118*a-d* via a communications transceiver. The protocol consists of a predetermined set of commands and responses. The commands and the responses are generally asynchronous packetized messages that are communicated between the server 120 and the mobile devices 118*a-d*.

In some embodiments, the server 120, via the CDD 128, communicates configuration data to the mobile devices 118*a-d* as the payload of a single packet. Accordingly, the small configuration data serves many purposes. For example, in environments where the data communication services are not robust, a small data payload increases the likelihood of communication success. As another example, the small configuration data reduces the power consumed by the mobile devices 118*a-d*.

In some embodiments, the commands are grouped together and communicated between the CCD 128 and the mobile device 118*a-d* as a particular configuration file. The configuration file may be small or large, but typically represents rules, or configuration data points, passed to the mobile device 118*a-d* that are to be followed by the device when collecting data. In some cases, the configuration file has executable code that carries out or otherwise directs the rules, but in other cases, the configuration file has only indicators of which pre-programmed commands that the mobile device 118*a-d* will follow.

Within server 120, the proprietary protocol commands and responses between the server 120 and the mobile devices 118*a-d* are communicated through the client data daemon 128. A retry mechanism of the CDD 128 operates to provide robust communication of messages between the server 120 and the mobile devices 118*a-d*. For each transmitted and/or received message that requires a response, the CDD 128 tracks whether such response was received and/or transmitted respectively. CDD 128 further tracks messages that are transmitted and/or received that do not require a response. Additionally, the CCD 128 functions as a load balancer between servers 120 so that a large server farm can be created to handle a large number of mobile devices 118*a-d*.

When data messages are received from a mobile device 118*a-d*, CDD 128 validates, buffers, parses, and partitions the data into predetermined data points. For example, when a mobile client device 118*a-d* transmits a stream of collected test data, the CDD 128 will confirm that the stream is valid using a technique such as a CRC check. The CDD 128 will further create a set of pointers into the data stream that identify particular items of the data such as signal strength, location, connected cell tower, distance from the cell tower, and other data. And the CDD 128 will partition the data into blocks for the Data Translation Module 130.

Communication of the data messages, any configuration data (e.g., a configuration file), or any other communications between the mobile device 118*a-d* and server 120 are optionally encrypted. Available encryption schemes such as the exchange of secure keys in a symmetrical, asymmetrical, or some other fashion, may all be used. By using an encryption scheme, the information passed between the mobile device 118*a-d* and server 120 are kept confidential.

In a preferred embodiment the validation of the information operates to prevent fraudulent and/or malicious information from infecting the mobile device 118*a-d* and/or the server 120. In addition, the validation of the information may also be used to govern the amount of user quality data measurements received by the server 120. E.g., legitimate data from a mobile device may be rejected if the server determines that the data is not necessary.

The Data Translation Module 130 (DTM) is a subcomponent of server 120. DTM 130 is responsible for buffering and converting separate user quality data points from each mobile device 118*a-d* into a database column name. The DTM 130 provides a mechanism that permits a system administrator operating server 120 to change the database 136 structure without a need to make corresponding changes on the mobile devices 118*a-d*.

Within database 136, one or more of the data points on the mobile device 118*a-d* have a corresponding column name. In some embodiments, all of the data points have a corresponding column name in the database. DTM 130 performs the translation of data points to column names via a lookup table, a user inquiry, an analysis of a unique identifier of the mobile device 118*a-d*, or by some other means.

DTM 130 further provides a buffering function for server 120. That is, in some circumstances, a large amount of data is asynchronously received from one or more mobile devices 118*a-d*. In such cases, DTM 130 temporarily stores some or all of the data until it can be further processed by other components of server 120.

After data received from a mobile device 118*a-d* has been passed through the DTM 130, the data is analyzed by a data filtering module 132 (DFM). The DFM 132 is a subcomponent of server 120 that is operable to remove one or more invalid or uninteresting data points before the data is stored in database 136.

Invalid or uninteresting data points occur in situations where a mobile device 118*a-d* may have streamed only a partial set of data or where the mobile device 118*a-d* has streamed an entire set of data, but some data fields in the set are not loaded with useful data. Data that is invalid, uninteresting, or otherwise not useful includes empty data points, data points from locations that are not interesting to the system, data points that are cumulative, and the like.

As described herein with respect to the mobile devices 118*a-d*, they may be in the middle of sending data and the user may request use of the same resources, such as by making a phone call.

The mobile device 118*a-d* would send a hold signal to the server 120 indicating that it has temporarily suspended operations for one or more reasons such as a low battery life, user commands, or the like.

In one embodiment, the server 120 will discard the partial data received and instruct the mobile device 118*a-d* that it has done so. The data can be resent or discarded, according to the needs of the server. For example, if there is a large amount of data already, the server may elect to discard it; alternatively, if there is a small amount of data already, the server may wish it to be resent from the beginning.

In a second embodiment in which transmission from the phone is interrupted, the server 120 will have the first part of the transmission and instruct the mobile device 118*a-d* that when it is available again to continue sending the data where it left off.

In some cases, the user location profile is used by the DFM 132. For example, DFM 132 may use the user location profile to determine that an abundance of relevant, up-to-date data of a particular type is already stored in database 136. In such circumstances, DFM 132 may ignore or actively remove some of the data from the mobile device 118*a-d*.

Further, in some embodiments, DFM 132 may even update the user location profile so that server 120 directs an associated mobile device 118*a-d* in its future data collection operations. For example, in one scenario, DFM 132 determines that sufficient data of a particular type and/or location from a mobile device 118*a-d* is already stored in database 136. In another scenario, DFM 132 determines that database 136 contains insufficient data of a particular type. In these cases, DFM 132 may update the user location profile with representative information that server 120 later communicates to the associated mobile device 118*a-d*.

Upon detection by the DFM 132 of invalid or uninteresting data points, DFM 132 operates to remove the invalid or uninteresting data points from consideration by server 120. For example, DFM 132 may load identifiable indicators such as null pointers into the fields where data will not be extracted and saved. Alternatively, DFM 132 may set flags indicating that particular data fields are not to be saved.

After DFM 132 identifies data from a data stream that is to be stored in database 136, a database storage module 134 (DSM) is activated. The DSM 134 is a subcomponent of server 120. DSM 134 is responsible for storing the filtered data points into database 136.

Generally, DFM 132 inserts the preprocessed data into database 136 using a simple and fast insert command, for example a SQL command. Simple commands reduce the load on database 136, which permits database 136 to support a large number of devices.

In a preferred embodiment, database 136, a subcomponent of server 120, is a relational database accessible by Structured Query Language (SQL) commands. Database 136 maintains and stores the user quality test data received from mobile devices 118*a-d*, configuration data for mobile devices 118*a-d*, and other data related to the wireless network performance measurement system 110. In the preferred embodiment, DSM 134 builds SQL queries to store, retrieve, modify, and delete data in database 136. DSM 134 further builds SQL queries to perform the administrative duties necessary to configure and manage database 136.

Another subcomponent of server 120 is a client configuration manager 138 (CCM). The CCM 138 directs high level communications with mobile devices 118*a-d* to manage the configuration and the updating of a client software application loaded in mobile devices 118*a-d*. For example, CCM 138 communicates to mobile devices 118*a-d* commands that include directives to collect a predetermined set of user quality data points, directives of when to collect data, directives that identify a geographic region from which to collect data, and the like.

CCM 138 is coupled to database 136, and CCM 138 has access to the organizational structure of database 136. CCM 138 is operable to manage a large number of mobile device clients 118*a-d* by accessing the organizational structure of database 136. That is, CCM 138 is operable to communicate directions to various groups of mobile devices 118*a-d*, individual mobile devices 118*a-d*, or even to every mobile device 118*a-d* that is part of the wireless network performance measurement system 110.

One function of the CCM 138 is to perform device management from a configuration and software version control perspective. The CCM 138 is able to instruct one or more devices, which may be divided into groups, to update the current mobile device 118*a-d* software to a specified version. In some cases, the CCM 138 allows server 120 to set up the configuration of each device individually, and in other cases, CCM 138 allows server 120 to configure a group of devices. The CCM 138 will also query a mobile device 118*a-d* or a group of devices for their status; such as battery strength, flash and memory space available, and other status variables.

In one embodiment, a mobile device 118*a-d* will initiate a request to be updated by server 120. For example, a mobile device 118*a-d* will request a new configuration file from server 120. In other embodiments, server 120 will initiate a download of configuration information, such as a new configuration file, to the mobile device 118*a-d*. The communication of the configuration file may be manually directed or may be scheduled for automatic operation. In such cases, when the new configuration file or other information is downloaded wirelessly, server 120 and the mobile device 118*a-d* form an HTP, UDP, FTP or other connection to facilitate the download.

In one embodiment, the configuration file is very small. In such an embodiment, the configuration file is transmit as a payload of a single message packet from the server 120. Accordingly, the small configuration file serves many purposes. For example, in environments where the data communication services are not robust, a small data payload increases the likelihood of communication success. As another example, the small configuration data file reduces the power consumed by the mobile device 118*a-d*.

The server 120 of the wireless network performance measurement system 110 presents a structured device management architecture to direct the operation of as few as one and as many as thousands of mobile devices 118*a-d*. The structured architecture further permits the data collection from many mobile devices 118*a-d* to be synchronized with other mobile devices.

For example, synchronized data collection permits multiple mobile devices 118*a-d* to be directed with either the same or complementary data collection techniques. In this manner, the effectiveness of each mobile device within the wireless network performance measurement system 110 may be increased. For example, in some cases, the real time location of the device (e.g., the user location profile) is used to determine which data will be collected. In other cases, different criteria are used to direct the data collection including the type of device, the current application load, the signal strength indication, or the like.

Within the wireless network performance measurement system 110, one or more mobile devices 118*a-d* can be associated with one or more particular groups by the CCM 138 of server 120. The grouping permits a server 120 to configure multiple mobile devices 118*a-d* with a common set of data collection rules such as a data collection update schedule.

In one example, a plurality of mobile devices 118*a-d* is grouped according to a geographic area where the plurality of mobile devices 118*a-d* is operating. The plurality of mobile devices 118*a-d* can be further grouped into subgroups, and the subgroups may be further divided into more narrow geographic areas, overlapping geographic areas, or the like. In this way, via multiple CCM 138 groupings, server 120 can communicate customized rules or configuration data to the one or more particular groups.

Generally, the mobile device 118*a-d* is unaware of which group it is currently associated with, but in some cases, during system testing for example, the mobile device 118*a-d* is aware of its group assignment. Instead, most often, each mobile device 118*a-d* merely takes direction from server 120 in the form of wireless commands. The wireless commands can direct the mobile devices 118*a-d* to perform wireless network user quality data collection operations at different times, at different locations, different frequencies, according to the cell tower the mobile devices 118*a-d* are associated with, or the like.

The server 120 is operable to provide direction to mobile devices 118a-d via wireless communication. In one embodiment, communication between the server 120 and the mobile device 118a-d is facilitated through one or more data sockets. That is, server 120 opens a data socket to a mobile device 118a-d, which permits the server 120 to direct the mobile device 118a-d when the rules are to be changed, software is to be updated, or any other control information is to be exchanged. In cases where a single socket is opened by the CDD 128, the communication of all control information over the single socket to a single mobile device 118a-d is helpful to efficiently use data network resources.

Server 120 is operable to update and modify the data collection rules for mobile devices 118a-d. In some cases, server 120 configures the mobile devices 118a-d with parameters including a list of data points to collect, a list of real-time locations identifying where data will be collected, and an indication of how often data points should be collected. Server 120 may configure each mobile device 118a-d asynchronously and at any time, or server 120 may configure groups of mobile devices 118a-d concurrently.

Several data collection rules determined within the CCM 138 direct the data collection operations on the mobile devices 118a-d. By directing the mobile devices 118a-d to operate under a set of changeable rules, the value of the data that is collected by the mobile devices 118a-d and communicated to the server 120 is improved.

One rule, or configuration datum, passed to mobile device 118a-d is a cell tower list rule. The cell tower list rule includes a list of cell tower areas communicated to the mobile device. The cell tower list informs the mobile device 118a-d data collection is desired by the server 120. According to this rule, the mobile device 118a-d is directed to monitor the identity of a currently connected cell tower and provide user quality data to server 120 if the connected tower is identified on the cell tower list. Subsequently, if the mobile device 118a-d connects to a new cell tower, the mobile device 118a-d is directed to re-scan the cell tower list and determine if data collection has been directed. In some cases, server 120 directs the mobile device 118a-d to disable the cell tower list, which is a direction to the mobile device 118a-d to collect data in all areas.

The cell tower rule may further take advantage of the user location profile generated for a mobile device 118a-d. For example, the known location of the cell tower may cooperatively be used with the present location of the mobile device 118a-d and the user location profile to collect particular data at particular times and in particular locations. Such information, when combined with a particular cell tower, provides an opportunity to collect very specific data related to the operation of the wireless network 122.

Two other rules communicated by server 120 to mobile devices 118a-d are a data speed test frequency rule and a data latency test frequency rule. The rules include a value of how many seconds the mobile device 118a-d will wait between each data speed test or each data latency test respectively. Server 120 can direct mobile device 118a-d to run a data speed or data latency test at a single frequency, at a particular pattern of frequencies, a random frequency, or at some other interval. Further, individual cell towers or groups of cell towers in the cell tower list rule (e.g., the user location profile) can correlate independent values for the data speed and data latency test frequency rules. In addition, when the cell tower list is disabled, independent default values may be specified for the data speed and data latency test frequency rules.

Through the data sockets, a particular command channel can be opened up from server 120 to a mobile device 118a-d.

The command channel may be initialized by either the server 120 or the mobile device 118a-d, and either unit may initiate a control cycle. The command channel permits the communication of control information between the server 120 and the mobile device 118a-d.

Using the command channel between the server 120 and a mobile device 118a-d, server 120 can interrogate the mobile device 118a-d for the current client application software version. For example, server 120 may send a "VERSION" command to a mobile device 118a-d. The mobile device 118a-d will return the current client application software version number to server 120. In one embodiment, the version number will be a single floating point number.

Using the command channel between the server 120 and a mobile device 118a-d, server 120 can update the client application software of the mobile device 118a-d to different version. Generally, after the client application software of the mobile device 118a-d has been updated, the new version of client software will restart without the need to reboot the mobile device 118a-d.

When the server 120 updates the client application software of the mobile device 118a-d, the update may be small or large. For example, in some cases, server 120 downloads a small configuration file part of the client application software, and in other cases, server 120 completely replaces all of the present client application software on the mobile device 118a-d with a fresh version. In some cases, the client application software is encrypted, encoded, and/or otherwise compressed for reasons that include security, privacy, data transfer speed, data cost, or the like.

The command channel between the server 120 and the mobile device 118a-d can be used for many other commands. For example, an UPDATE command is useful for sending a name string from the server 120 to the mobile device 118a-d. A TIME_SYNC command is useful for synchronizing the current time, date, day or other chronological information between server 120 and one or more mobile devices 118a-d.

The use of particular rules for data collection, along with the command channel for communicating commands, permits the server 120 to direct a mobile device 118a-d to collect significant data related to the wireless network performance measurement system 110. For example, in a preferred embodiment, Table 1 lists several data sets and individual data points, which server 120 may direct a mobile device 118a-d to collect.

TABLE 1

| Data collected and communicated to a server |
|---|
| Cellular Network Signal Strength |
| 802.11 Network Signal Strength |
| Network Capability level (Ex. 2G, 3GPP, LTE, etc.) |
| Network Technology (Ex. WiMAX, EDGE, etc.) |
| Data Transfer Speed, both Upload and Download |
| Data Transfer Latency from the device to the server and the gateway |
| Video Quality at different bitrates |
| Dropped Call/Network errors |
| Transition from one cellular network technology to another technology such as a transition from 3G to Edge. |
| Audio Quality both directions on different cellular network technologies such as 3G, Edge, etc. |
| Battery Life on different mobile phones and different cellular network technologies |
| Lost audio network packets that is experienced as choppy or poor audio |
| SMS/Text latency |
| Tower ID |
| Signal to Noise Ratio (SNR) |

A non-limiting example of the operation of server 120 is now described. In the example, a particular set of rules (e.g., a configuration file) are defined by CCM 138 in order to direct a group of mobile devices 118a-d. The group information is retrieved by the CCM 138 via queries to database 136. CCM 138, after building the commands and data structures to direct the mobile device 118a-d group, communicates the directives to the group of mobile devices 118a-d via the CDD 128.

When mobile devices 118a-d collect information as directed by server 120, the mobile devices 118a-d asynchronously pass the information to server 120 via CDD 128. The data is collected through the DTM 130, filtered by the DFM 132, and stored in database 136 via DSM 134. After the data has been stored in database 136, DCM 140 analyzes and processes the data. DCM 140 further communicates a representation of some or all of the data to a web server for presentation to users.

Figure 3A:
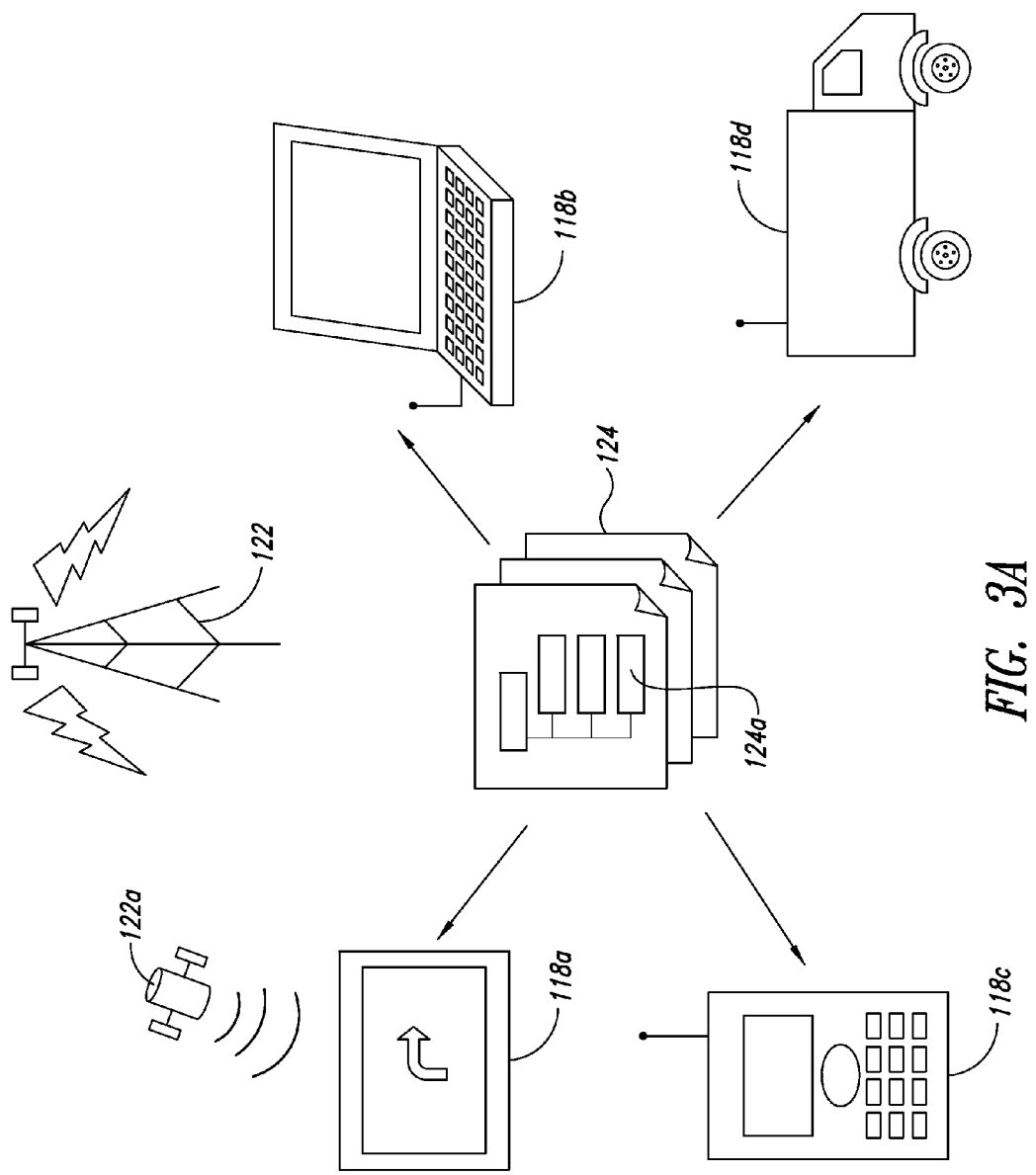
FIG. 3A illustrates examples of the mobile devices of FIG. 2.

FIG. 3A illustrates examples of the mobile devices 118a-d of FIG. 2. A handheld global positioning device 118a receives positioning information from a satellite network 122a and mapping information from a cellular network 122. A laptop computer 118b is outfitted with an external wireless card for sending and receiving voice and/or data over a cellular network 122. A mobile telephone 118c is most often used for voice and data communications on a cellular network 122. An automobile 118d commonly has cellular network 122 accessing capability for voice and data communications. The representative illustrations of FIG. 3A are merely non-limiting examples of the type of mobile wireless network client devices useful for collecting wireless network performance measurements. Many other client devices, including personal media players (PMP's), personal digital assistants (PDA's), handheld personal computers (HPC's), and the like can also be configured as described herein to collect network data. In fact, virtually any computing device with a compatible transceiver and proper configuration can be a mobile device 118a-d.

Also illustrated in FIG. 3A are a particular collection of software instructions 124. The software instructions 124, as described herein, are useful to direct the mobile devices 118a-d in collecting communication network performance quality data. Software instructions also have a configuration data file 124a, which is useful for directing the mobile device 118a-d data collection operations.

Figure 3B:
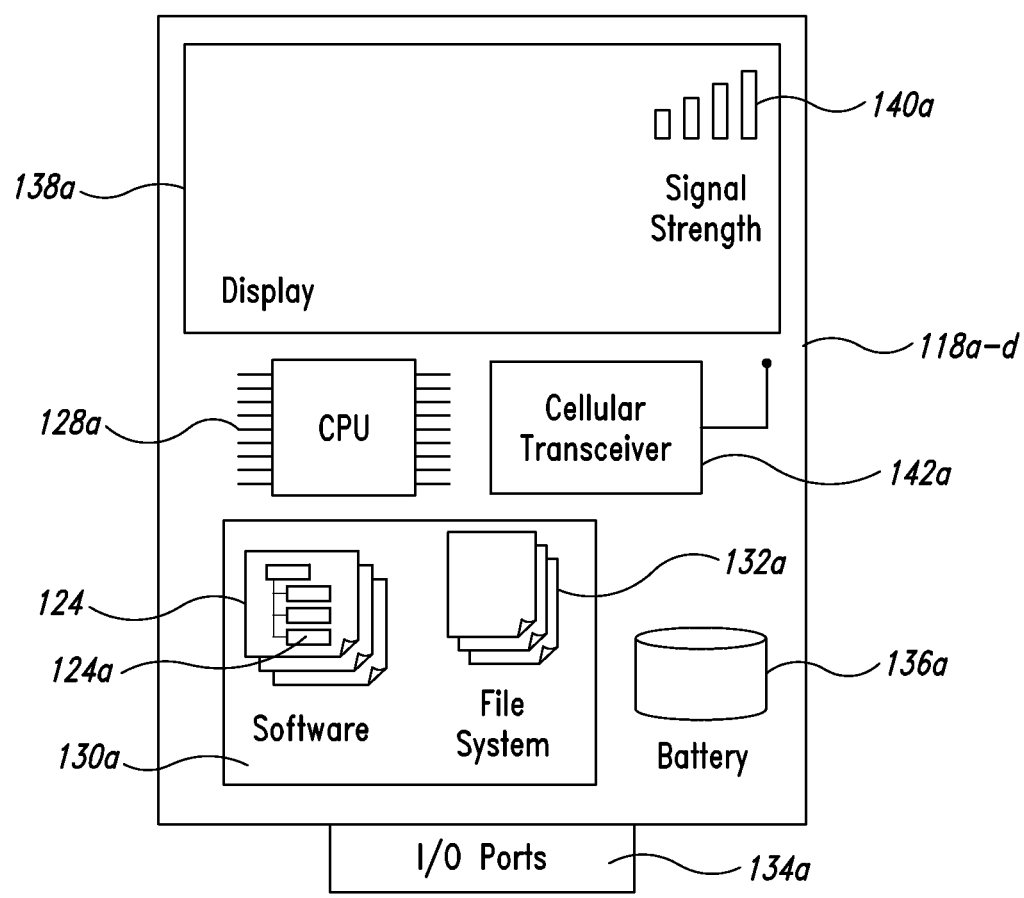
FIG. 3B illustrates several components of mobile devices from FIG. 3A.

FIG. 3B illustrates several components that mobile devices 118a-d have in common. The mobile devices 118a-d are electronic communications devices having a central processing unit 128a and a volatile and/or non-volatile memory 130a. The memory 130a stores instructions and data acted on by CPU 128a.

Memory 130a comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like.

Inside memory 130a, a particular collection of software instructions 124 are executed by CPU 128a in order to collect performance characteristics of the mobile device 118a-d, e.g., network data. The software instructions 124 operatively configure hardware and other software in the mobile device 118a-d so that particular test conditions may be set up and particular measurements may be taken. The test conditions, the resulting measurements, and other data are stored in a file system 132a. File system 132 may be a traditional file system, one or more database systems, or any other method known in the art for storing such information, or any combination of the above, including implementation using distributed computing techniques.

The mobile devices 118a-d further have a collection of input/output ports 134a for passing data over short distances to and from the mobile device 118a-d. For example, serial ports, USB ports, WiFi ports, Bluetooth ports, IEEE 1394 FireWire, and the like can communicatively couple the mobile device 118a-d to other computing apparatuses.

Mobile devices have a battery 136a and a display 138a. In many mobile devices 118a-d, a signal strength indicator 140a is prominently positioned on the display 138a to provide network communication connectivity information to the mobile device 118a-d operator.

A cellular transceiver 142a is used to couple the mobile device 118a-d to other communication devices through the cellular communication network 122. In some cases, software 124 and data in file system 132a are communicated between the mobile device 118a-d and a server 120 via the cellular transceiver 142a. That is, bidirectional communication between a mobile device 118a-d and a server 120 is facilitated by the cellular transceiver 142a. For example, a server 120 may download a new or updated version of software 124 to the mobile device 118a-d over the cellular communication network 122. As another example, the mobile device 118a-d may communicate network performance measurement data stored in file system 132a to the server 120 over the cellular communication network 122.

Each mobile device 118a-d client has electronic memory 130a accessible by at least one central processing unit 128a within the device. The memory 130a is programmed with software 124 that directs the one or more central processing units 128a. Some of the software modules in the memory 130a control the operation of the device 118a-d with respect to collection of data. In some cases, software 124 directs the collection of individual datums, and in other cases, software 124 directs the collection of sets of predetermined cellular network, geographical, and device test measurements.

Software 124 may include a fully executable software program, a simple configuration data file 124a, a link to additional directions, or any combination of known software types. When the server 120 updates software 124, the update may be small or large. For example, in some cases, server 120 downloads a small configuration data file 124a to as part of software 124, and in other cases, server 120 completely replaces all of the present software 124 on the mobile device 118a-d with a fresh version. In some cases, software 124 is encrypted, encoded, and/or otherwise compressed for reasons that include security, privacy, data transfer speed, data cost, or the like.

A mobile device 118a-d executing software 124 addresses many shortcomings of the conventional methodology. Generally speaking, the conventional methodology uses an optimized antenna and transceiver system, which is not capable of collecting true, end-user experience data. In contrast, software 124 enables a specific mobile device 118a-d, provisioned for typical operation on a wireless communication network, which a user operates to access the wireless network, to collect location based true user quality data. The mobile device 118a-d is operable to access contracted wireless network services provided by the wireless cellular communication network 122.

More particularly, software 124 provides many advantageous features for the wireless network performance measurement system 110. The advantageous features are not found in the conventional methodology. For example, software 124 runs as a software application on a production-type mobile device 118*a-d* whereas the conventional methodology requires customized test equipment. Software 124 minimizes power consumption on the mobile device 118*a-d* while collecting information such as network parametric data, device location data, and user experience quality data, but the conventional methodology ignores power consumption. In addition, software 124 is directed by a centralized server 120, and software 124 sends data to a centralized server farm, but the conventional methodology has no such provision. The data sent by the mobile device 118*a-d* to the centralized server 120 can be used to evaluate, compare and improve the overall user experience on the wireless network that a user of device 118*a-d* operates for both voice and data communications.

In a preferred embodiment, software 124 collects information about the quality of the wireless communication network 122 that reflects actual user experience. The technique used in a mobile device 118*a-d* is to employ the actual hardware that a user operates when accessing the wireless network 122. The actual hardware includes the radio module, the audio module, the display module, and the other circuitry of the mobile device 118*a-d*.

One information datum collected includes network signal strength. Network signal strength is collected using the same network signal strength measurement that is presented to the user. This is useful because a user often monitors the network signal strength, e.g. through an icon. It is understood that the true network quality is not necessarily reflected correctly by the presentation to the user; however, the network signal strength presented to the user affects the user's impression of the network quality.

Network signal strength may have many components and representations. That is, network signal strength is particular to the mobile device 118*a-d* and the network 122 where the device is operating. For example, in some cases, network signal strength is a simple power measurement in milliwatts (mW) of the magnitude of the received signal's electric field, and in other cases, the power is measured as a ratio in decibels (dB) related to a one milliwatt reference signal (dBm). In still other cases, network signal strength refers to a signal to noise ratio, which is a relative determination between the strength of the desired radio information signal and the undesired noise interfering with it. Broadly understood, network signal strength is any measurement that characterizes the intensity and integrity of the wireless information signal received by the mobile device 118*a-d*.

Another information datum collected is data transmission speed. Data transmission speeds are generally collected using the highest level of application programming. This datum is useful because it takes into account even the degradation due to the mobile device hardware, software, and current operational environment. Data transmission speeds may include both voice or other data. Data transmission speed measurements may include both transmit and receive measurements, i.e., data transmitted by the mobile device 118*a-d* through the network 122 and data received by the mobile device 118*a-d* through the network 122. In some cases, the data transmission speeds are known as data download and data upload speeds.

Audio quality information is also collected. Audio quality is measured using the actual microphone and speaker of the mobile device 118*a-d* that the user uses to make and receive calls. In this way, information related to a user's true audio experience will be measured.

In the preferred embodiment of the new wireless network performance measurement system 110, several considerations are taken into account to minimize the impact of data collection on the user's actual experience of operating the mobile device. For example, power management, system responsiveness, audio path disruption, ease of installation, and background execution are all considered as described herein. If the functionality of any of these considerations is degraded by the data collection, then the user's experience is adversely affected significantly. The data collection software is selected to execute in a manner that will not affect the measurement of the system being measured. Several examples of this will now be given.

A first example is power consumption. Even though mobile devices 118*a-d* are capable of hard-wired, external power or conventional alternating current (AC) power connections, many devices are powered substantially by batteries. In some cases, the batteries are disposable, and in other cases, the batteries are rechargeable, but in either case, batteries are generally capable of operating the device for only a short time before needing to be replaced or re-charged by the device operator. That is, after just a few hours, days, weeks, or some other short time period, the operator must attend to the expended batteries. Accordingly, maximizing the battery life of a mobile device 118*a-d* is often a goal of device manufactures, device sellers, and device users.

The mobile device 118*a-d* uses power during data collection. That is, the execution of software and the operation of hardware solely for the purpose of collecting, processing, and distributing test data will expend power that would not otherwise be expended. If wireless network performance measurement system 110 minimizes its power usage, then the attention to the battery required by the device 118*a-d* is minimized. The additional power consumed by the testing can be considered and taken into account when measuring power consumption in one embodiment. The power consumed by the testing software 124 will not be considered a power consumed by the system in such an embodiment. In other embodiments, the battery life will be reported based on the life as it would have been without the test software 124 running at various times.

In a preferred embodiment of software 124, data is collected only in certain locations and as infrequently as possible to minimize overall power consumption of the mobile device 118*a-d*. By reducing the data collection locations and frequency, power usage is reduced and correspondingly, the user's perception that software 124 is detrimentally affecting the power usage of the mobile device 118*a-d* is reduced.

A second example is internal CPU usage. The test software 124 makes use of the CPU, so that when it is executing, the CPU usage goes higher. The software 124 monitors how much its own use is adding to the CPU usage factor and subtracts this from the measurement, according to one embodiment.

A third example is bus throughput on internal bus data transmission speed. To the extent running the tests affects the internal bus throughput, this is accounted for and removed from the test results.

A fourth example is interrupt measurements, which, since the CPU receives interrupts as part of its standard operations and also when being tested by software 124, these test based interrupts should not be counted in the system performance. More or less of these accommodations of the measurement affecting the measured quantity can be considered and taken into account by the software 124 according to various embodiments.

In order to collect data only in certain locations, one embodiment of software 124 records and updates the name and/or ID of the currently connected (i.e., associated) cell tower. In many devices, the radio module independently communicates with one or more cell towers. A cell tower that has established connection with a device supplies its name and/or ID to the device, and the name and/or ID is stored in the radio module. The data exchange that transfers the cell tower name to the mobile device 118a-d is a transaction that is executed independently on the device. The transaction is even executed when the mobile device 118a-d is in a power saving mode.

The wireless network performance measurement system 110 uses the cell tower name to break down data collection coverage areas into sectors. Server 120 maps out these sectors to determine which sectors should be updated with fresh data. Based on the sector mapping, or based on the least recently updated sector, or based on some other means, server 120 will send a particular cell tower update list to the mobile device 118a-d. The cell tower update list includes cell tower names identifying sectors where server 120 requests updated wireless network performance data. When the mobile device 118a-d detects that it is connected to a cell tower on the list, the mobile device 118a-d will collect data whenever the device moves more than some predetermined amount, for example 30 meters.

In another preferred embodiment, a unique user location profile may be generated for a mobile device 118a-d operating in a wireless network performance measurement system 110. For example, each mobile device identified by server 120 may be given a unique identifier. The unique identifier may be a random number, an Electronic Serial Number (ESN), an International Mobile Equipment Identifier (IMEI), or some other number. In many cases, the number is encrypted. After generating the unique identifier, the identifier may be combined with typical geographic and time information to create the unique user location profile for each mobile device 118a-d.

After a user location profile is generated for a mobile device 118a-d, the profile is available for use by server 120 to collect particular data at particular times and in particular locations. In some cases, server 120 can use the profile in a predictive manner, and in other cases, server 120 can use the profile to make decisions about data retrieval from particular mobile devices 118a-d. The server 120 sends new software 124 (e.g., a configuration data file 124a) to the mobile devices 118a-d in order to change the testing being performed. It also sends instructions and queries to the software 124 to cause it to execute selected routines as directed by the server 120 or for the server to understand what version of the software 124 is present on each of the devices 118a-d, what tests each is conducting at any given time, and to learn other things about the respective devices 118a-d.

In order to collect data only in certain locations and as infrequently as possible, server 120 actively monitors how many mobile devices 118a-d are currently in a particular sector. Server 120 further monitors which sectors have outdated or otherwise insufficient data. Server 120 may increase or decrease the frequency of data collection of a mobile device 118a-d based on the age, quality, or volume of data previously gathered. Software 124 in a mobile device 118a-d is responsive to the requests for data of server 120.

When the wireless network performance measurement system 110 is initialized in a new geographical area, the number of data collection mobile devices 118a-d may be small. Performance and power considerations are considered for each mobile device 118a-d, so server 120 may only request data in certain areas of interest, and server 120 may function to prevent or minimize the collection of data in overlapping areas. For example, in areas where there are few mobile device clients 118a-d, the mobile device client may be requested to collect data with greater frequency only in areas where server 120 does not currently have data. Alternatively, server 120 may reduce or suspend requests for data in areas where server 120 does not currently have data. In other cases, server 120 may request data based on one set of parameters, but software 124 of mobile device 118a-d may decide locally whether and how to respond to the request based on a local set of parameters. Parameters that software 124 may use to decide whether and how to respond include current battery life, current processor utilization, scheduled events, and the like.

In some cases, the wireless network performance measurement system 110 is initialized or operating in a geographical area where the number of data collection mobile devices 118a-d is large, e.g., 5000 or more devices. In such cases, server 120 may further function to adjust the frequency and/or volume of data collection by a particular mobile device 118a-d. For example, rather than collecting data from every device, server 120 may collect data from only some devices and use techniques such as statistical modeling, to create a complete set of wireless network performance data. As another example, server 120 may direct some mobile devices 118a-d to collect data of one type and direct other mobile devices 118a-d to collect data of another type. The wide range of data collection directions provided by server 120 in a geographical area having many mobile devices 118a-d reduces the demand for power due to data collection on each mobile device 118a-d.

Another technique used by the server 120 to direct data collection only in certain locations and as infrequently as possible is to take advantage of location based services on the mobile device, for example, the global positioning systems (GPS) within some mobile devices 118a-d. The GPS is capable of providing latitude and longitude coordinates as well as other distance and positional information. Operating the GPS circuitry, however, uses a large amount of power on most devices. Accordingly, it is often desired to collect GPS data only when mobile device 118a-d has changed location.

One technique used to minimize the frequency of GPS driven data collection is to take advantage of the cellular network's capability to provide the distance of the mobile device 118a-d from the closest cellular tower or any other cellular tower. The cellular tower information is collected by the radio hardware in the mobile device 118a-d, so a request from software 124 to the radio hardware for this information will generally not increase power consumption. More particularly, each radio module on the mobile device 118a-d monitors the distance between the device and the currently connected cell tower. This distance data is independently updated by the radio module on the mobile device 118a-d even in a power saving mode. By monitoring the value of this distance, software 124 can detect when the mobile device 118a-d is in motion and when the mobile device 118a-d has moved from a particular position by a predetermined amount, e.g., 30 meters.

Using the distance information from the cellular tower, a set of data collection rules provided by server 120 or otherwise available to software 124 direct whether or not the GPS module needs to be engaged. For example, if the distance to the closest cellular tower has not appreciably changed, then the mobile device 118a-d may not be directed to capture new GPS coordinates and new network performance data.

Another data set collected by the wireless network performance measurement system 110 is the speed of data transmission across the wireless network 122 and within the mobile device 118a-d. The collection of data speed measurements, however, consumes power. Data speed measurements involve sending and receiving network data using the mobile device's 118a-d wireless radio transmission and reception circuitry.

There are several techniques used to reduce the power consumption of the data speed measurement test. For example, in one technique, mobile device 118a-d is only directed to collect data when the device is at a specific location. In a second technique, data speed measurements are performed infrequently on any given device, but the data speed measurements are performed on many devices so that a wide range of data is gathered. In a third technique, data speed measurements are collected by evaluating user or network directed data transmissions instead of sending and receiving dedicated test data for the data speed measurement. In a fourth technique, dedicated test data is piggybacked on a preexisting data transmission. In many cases, power consumption for data speed measurement is reduced because the radio is already being operated for another purpose, e.g., when a user is checking email, surfing the web, transferring files, or some other user requested purpose.

Data collected by the mobile device 118a-d is returned to server 120. Another technique useful to saving power on the mobile device 118a-d is to adjust the manner in which the data is returned to server 120.

Many devices, such as mobile device 118a-d, contain a large amount of file storage space. This storage space is useful to software 124 for storing wireless network performance data. In one embodiment, the software 124 is designed to send GPS and other test information to the server 120 only when it is plugged into a power supply. With file storage capability, software 124 can wait to send the data to the server 120 until the mobile device 118a-d is being charged or is otherwise operating from a power source more robust than a battery, such as an external source. Alternatively, in cases where it is not reasonable to wait until the device is being charged, software 124 can piggyback the performance data on user initiated data transfers. The piggy-backing technique minimizes the need to establish a new connection, which can reduce power consumption.

In some embodiments, software 124 operates in a Microsoft Windows Mobile environment. In a Microsoft Windows Mobile environment, the mobile device 118a-d is often connected to a PC using an ACTIVESYNC protocol. The ACTIVESYNC protocol is one of many similar configuration and networking protocols that use a wireless or wired network resource to transmit and receive data. In such cases, the mobile device 118a-d is charging, however the cellular radio functionality is temporarily disabled. In these environments, the technique of piggy-backing data on user-initiated data transmissions is useful to reduce power consumption on the mobile device 118a-d.

In other embodiments, software 124 functions in another commercially available operating system environment. In these cases, software 124 may be ported to specifically function in the particular operating system or software 124 may be generic enough to operating on several operating systems. In these cases, different techniques may be used to save power, transfer information, or the like.

Another useful technique is to take further advantage of circumstances where mobile device 118a-d is being charged or is otherwise operating from a robust power source (e.g., an external power source). In these cases, software 124 may be directed to conduct additional or more data intensive testing. For example, in some cases, mobile device 118a-d is plugged into a vehicle's power source. If the vehicle, e.g., an automobile, is moving, then the mobile device 118a-d may perform an expanded range of wireless network performance data collection.

Data may also be collected in mobile devices 118a-d without GPS capability and where the device stays within range of a particular cellular tower name.

The operation of software 124 is preferably un-noticed by a user of the mobile device 118a-d. More particularly, the software 124 should not cause the user to notice an impact on the CPU performance and file system of the mobile device 118a-d. One way to avoid this is to schedule software 124 to run at a very low priority. Another way is to permit user requested actions to be performed without delay. For example, in addition to operating at a low priority, software 124 can be configured to immediately suspend operation when a user requested action is detected.

Audio quality data is collected by the wireless network performance measurement system 110. Preferably, the measurement of audio data quality will not be noticed by the user of the mobile device 118a-d. One technique useful for keeping software 124 from impacting, adversely and significantly, the user experience of the mobile device 118a-d is to collect data when the audio circuitry is used, but to suspend processing of the data until the audio circuitry is no longer being used. For example, data may be collected during a phone call or during audio playback of a particular file, but any post-processing of the data occurs at a later time, and the results collected are transmitted to server 120 at a later time.

In a preferred embodiment, software 124 is easy to install and the installation procedure will have little or no user intervention. For example, the installation of software 124 may be composed of a simple over-the-air (OTA) download having a click install, no questions presented to the user, and not requiring the user to reboot the device. In this manner, the user will be aware that software 124 has been installed, but the installation procedure will have been relatively quick and easy.

Also in a preferred embodiment, software 124 will run generally in the background, transparent to the user. Preferably, the user will be aware that software 124 is performing data collection work on the mobile device 118a-d, but the actual operation of software 124 will be un-noticed. In this manner, a user may be encouraged to install software 124 and permit the mobile device 118a-d to collect data for the wireless network performance measurement system 110.

The wireless network performance measurement system 110 presents a structured device management architecture in which to operate software 124. The structured architecture permits an external device, server 120 for example, to direct the operation of mobile device 118a-d. The structured architecture further permits the data collection of mobile device 118a-d to be synchronized with other mobile devices.

For example, synchronization of data collection permits multiple mobile devices to be directed with either the same or complementary data collection techniques. In this manner, the effectiveness of each mobile device within the wireless network performance measurement system 110 may be increased. For example, in some cases, the real time location of the device is used to determine which data will be collected. In other cases, different criteria are used to direct the data collection including the type of device, the current application load, the signal strength indication, or the like.

Within the wireless network performance measurement system 110, a mobile device 118a-d can be associated with one or more particular groups on the server 120. The grouping permits a server 120 to configure multiple mobile devices 118a-d with a common set of data collection rules such as a data collection update schedule. Generally, the mobile device 118a-d is unaware of which group it is currently associated with, but in some cases, during system testing for example, the mobile device 118a-d is aware of its group assignment.

Mobile device 118a-d is operable to accept direction from server 120 when server 120 communicates with the mobile device 118a-d. In one embodiment, communication between the server 120 and the mobile device 118a-d is facilitated through one or more data sockets. That is, mobile device 118a-d opens a data socket to server 120, which permits direction from server 120 when the rules are to be changed, software is to be updated, or any other control information is to be exchanged. In cases where a single socket is opened, the communication of all control information over the single socket is helpful to reduce data network usage.

Server 120 is operable to update and modify the data collection rules for the mobile device 118a-d. For example, in some cases, server 120 configures the mobile device 118a-d with parameters including a list of data points to collect, a list of real-time locations identifying where data will be collected, and an indication of how often data points should be collected. Generally, server 120 configures the mobile device 118a-d asynchronously and at any time.

In a preferred embodiment, software 124 includes a configuration data file 124a. The configuration data file 124a is generally received from server 120 in a wireless manner, but other techniques may also be used. For example, a wired connection or a memory card may be used to provide the configuration data file 124a of software 124 of the mobile device 118a-d. Alternatively, the configuration data file 124a may not even reside on the mobile device, but instead be remotely located and merely accessible by the mobile device 118a-d.

The configuration data file 124a of software 124 may be small or large, but typically represents rules passed to the mobile device 118a-d that are to be followed by the device when collecting data. In some cases, the configuration data file 124a has executable code that carries out or otherwise directs the rules, but in other cases, the configuration data file 124a has only indicators of which pre-programmed rules that the mobile device 118a-d will follow.

Several data collection rules direct the data collection operations of the mobile device 118a-d. By operating the mobile device 118a-d under a set of changeable rules, the value of the data that is collected and passed to the server 120 is improved. For example, in some cases, the rules are directed to all mobile devices 118a-d, and in other cases, the rules are directed only to particular devices. Other preferred embodiments take advantage of the user location profile for the particular mobile device 118a-d. That is, based on the unique identifier for the mobile device 118a-d, the time, location, or other parameters of the device may be predictively and/or dynamically used to direct the data collection.

One rule passed to mobile device 118a-d is a cell tower list rule. The cell tower list rule includes a list of cell tower areas where data collection is desirable. According to this rule, software 124 monitors the identity of a currently connected cell tower, and when the mobile device 118a-d connects to a new cell tower, software 124 scans the cell tower list to determine if data collection has been directed. In some cases, the cell tower list is disabled, which is a direction to the mobile device 118a-d to collect data in all areas.

Two other rules passed to mobile device 118a-d are a data speed test frequency rule and a data latency test frequency rule. The rules include a value of how many seconds the mobile device 118a-d will wait between each data speed test or each data latency test respectively. Server 120 can direct mobile device 118a-d to run a data speed or data latency test at a single frequency, at a particular pattern of frequencies, a random frequency, or at some other interval. Further, individual cell towers or groups of cell towers in the cell tower list rule can correlate independent values for the data speed and data latency test frequency rules. In addition, when the cell tower list is disabled, independent default values may be specified for the data speed and data latency test frequency rules.

Through the data sockets, a particular command channel can be opened up from server 120 to mobile device 118a-d. The command channel may be initialized by either the server 120 or the mobile device 118a-d, and either unit may initiate a control cycle. The command channel permits the communication of control information between the server 120 and the mobile device 118a-d.

Using the command channel between the server 120 and the mobile device 118a-d, the centralized server 120 can interrogate the software 124 for its current version. For example, server 120 may send a "VERSION" command to mobile device 118a-d. Software 124 will return its current version number to server 120. In one embodiment, the version number will be a single floating point number.

Using the command channel between the server 120 and the mobile device 118a-d, the centralized server 120 can update the software 124 of the mobile device 118a-d to latest version. Generally, after the software 124 has been updated, the new version of software 124 will restart without the need for a reboot of the mobile device 118a-d.

The command channel between the server 120 and the mobile device 118a-d can be used for many other commands. For example, an UPDATE command is useful for sending a name string from the server 120 to the mobile device 118a-d. A TIME_SYNC command is useful for synchronizing the current time, date, day or the like between the server 120 and the mobile device 118a-d.

The use of particular rules for data collection, along with the command channel for communicating command information, permits the mobile device 118a-d to collect significant data related to the wireless network performance measurement system 110. For example, Table 1 lists several data sets and individual data points that are collected by a mobile device 118a-d in a preferred embodiment.

In a preferred embodiment of a mobile device 118a-d that is running the inventive data collection operations described herein, a program in software 124 executes. In one embodiment, descriptively called the Service Mode, the software 124 is operating in the background, with no indication to the user of the mobile device 118a-d that the program is running. At other times, descriptively called the Application Mode, the background application is accessible to the user of the mobile device 118a-d to either provide information to the user or to operate according to instructions from the user. Embodiments of both the Service Mode background application and the Application Mode foreground application will now be described with reference to the figures.

For example, on a mobile device 118a-d, in software 124, a data collection client software program is initialized and begins execution in the Service Mode. The program requests particular resources from the operating system that is executing on the mobile device 118a-d, and the program sets up particular data structures in software 124 and file system 132a, both of which are resident in memory 130a in the preferred embodiment.

In the Service Mode, the program typically has two main functions. A first function of the Service Mode operates to collect data from the mobile device 118a-d. A second function of the Service Mode operates to communicate the collected data to a central collection server.

In the Service Mode, the user does not have to dynamically interact with the software 124 to provoke the application to collect the required data. For example, a predefined set of rules may be present in software 124, or alternatively, a default configuration data file 124a is resident within software 124. The predefined rules or configuration data file direct the operations of the Service Mode. In other cases, if the default configuration is not present or is outdated, a new configuration data file 124a may be loaded into software 124 or file system 132. Advantageously, a configuration data file 124a permits quick and dynamic control of the Service Mode without substantial changes to software 124.

In one embodiment, the Service Mode operations will request a new configuration data file 124a from a server 120. In other embodiments, a server 120 will initiate a download of a new configuration data file 124a to the mobile device 118a-d. The communication of the configuration data file 124a may be manually directed or may be scheduled for automatic operation. In any case, when a new configuration data file 124a is downloaded wirelessly, server 120 and the mobile device 118a-d form an HTTP, UDP, FTP, or other connection to facilitate the download.

In one embodiment, the configuration data file 124a is very small. In such an embodiment, the configuration file 124a is received as a payload of a single message packet from the server 120. Accordingly, the small configuration file 124a serves many purposes. For example, in environments where the data communication services are not robust, a small data payload increases the likelihood of communication success. As another example, the small configuration data file 124a reduces the power consumed by the mobile device 118a-d.

In the preferred embodiment, the collection function of the Service Mode gathers a set of Key Performance Indicators (KPI), such as those found in Table 1. The mobile device 118a-d is scanned, and one, some, or a full set of all KPI are periodically collected and stored in memory 130a. For example, using an internal timing mechanism of the mobile device 118a-d, the KPI data may, by default, be collected one time every hour, one time every day, or by some other period.

In a preferred embodiment, the KPI data may be collected at the same time every hour or may be scheduled in another fashion. For example, the Service Mode may be configured to scan the mobile device 118a-d at the same time each hour within a 24-hour period, and then, at the beginning of the next 24-hour period, the minute within each hour when the KPI are collected is offset by a predetermined amount. In this manner, for example, if the predetermined amount of offset is one minute, then after a 60-day cycle, the mobile device 118a-d will have been scanned at every minute at least once throughout a 24-hour time span.

As another example, the KPI data may be collected at any time within a particular time window. That is, when the mobile device 118a-d is active, the current time may be retrieved, and if the current time is within a particular time window, then the mobile device 118a-d is scanned.

After KPI data is collected, the data is communicated in an update function of the Service Mode to server 120. The data may be requested by the server 120 or the communication of KPI data may be initiated by the mobile device 118a-d. For example, using an internal timing mechanism of the mobile device 118a-d, which may be the same or a different timing mechanism used during KPI data collection, the collected data may be communicated to the server 120.

In some cases, the Service Mode may have timers set to trigger a KPI data collection scan of the mobile device 118a-d at a time which overlaps another trigger set to send KPI data to a server 120. Advantageously, the KPI data collection scan is most often allowed to complete before the data is updated to server 120. In this way, the updated KPI data communicated to server 120 is the most recent data collected on the mobile device 118a-d.

As previously described, a configuration data file 124a in memory 130 directs the Service Mode to perform particular KPI data collection operations. The configuration data file 124a may be updated as needed to change which KPI data are collected, how often the KPI data is collected, the geographic location of where KPI data are collected, or any combination of these or other parameters.

For example, if it is determined that a particular geographic area in which a mobile device 118a-d operates has sufficient data that was collected during the morning, and a need for additional data during the evening, then an updated configuration data file 124a may direct the Service Mode to collect KPI data more frequently and only during the evening.

Other factors may also be used to update a configuration file 124a or to control operations of the Service Mode. For example, since mobile devices are generally sensitive to power consumption, the type of supply that is powering the mobile device 118a-d may also be considered. In one embodiment, a mobile device 118a-d that is plugged into a geographically fixed power supply, such as a cradle, will collect all KPI data available on mobile device 118a-d at a particular rate instead of just collecting the KPI data directed in a configuration data file 124a at a different rate. Similarly, if the mobile device 118a-d is plugged into a mobile power supply, such as a car charger, the Service Mode will operate to collect all KPI data more frequently or at a schedule impacted by geographic location. These and other modes are contemplated and easily directed by server 120 or by the programmed operation of the Service Mode.

Storage of the KPI is typically maintained until the KPI are off-loaded to server 120 or another server. In addition, or alternatively, the KPI may also be stored in a cyclical buffer arrangement wherein older data is released so that newer data may be collected.

Communication of the KPI data, the configuration data file 124a, or any other communications between the mobile device 118a-d and server 120 are optionally encrypted. By using an available encryption scheme, for example the exchange of secure keys in a symmetrical, asymmetrical, or other fashion, the information passed between the mobile device 118a-d and the server are kept confidential. In a preferred embodiment the validation of the information operates to prevent fraudulent and/or malicious information from infecting the mobile device 118a-d and/or the server 120. In addition, the validation of the information may also be used to govern the amount of KPI data received by the server 120. E.g., legitimate data from a mobile device 118a-d may be intentionally rejected if the server 120 determines that the data is not necessary.

Figure 4:
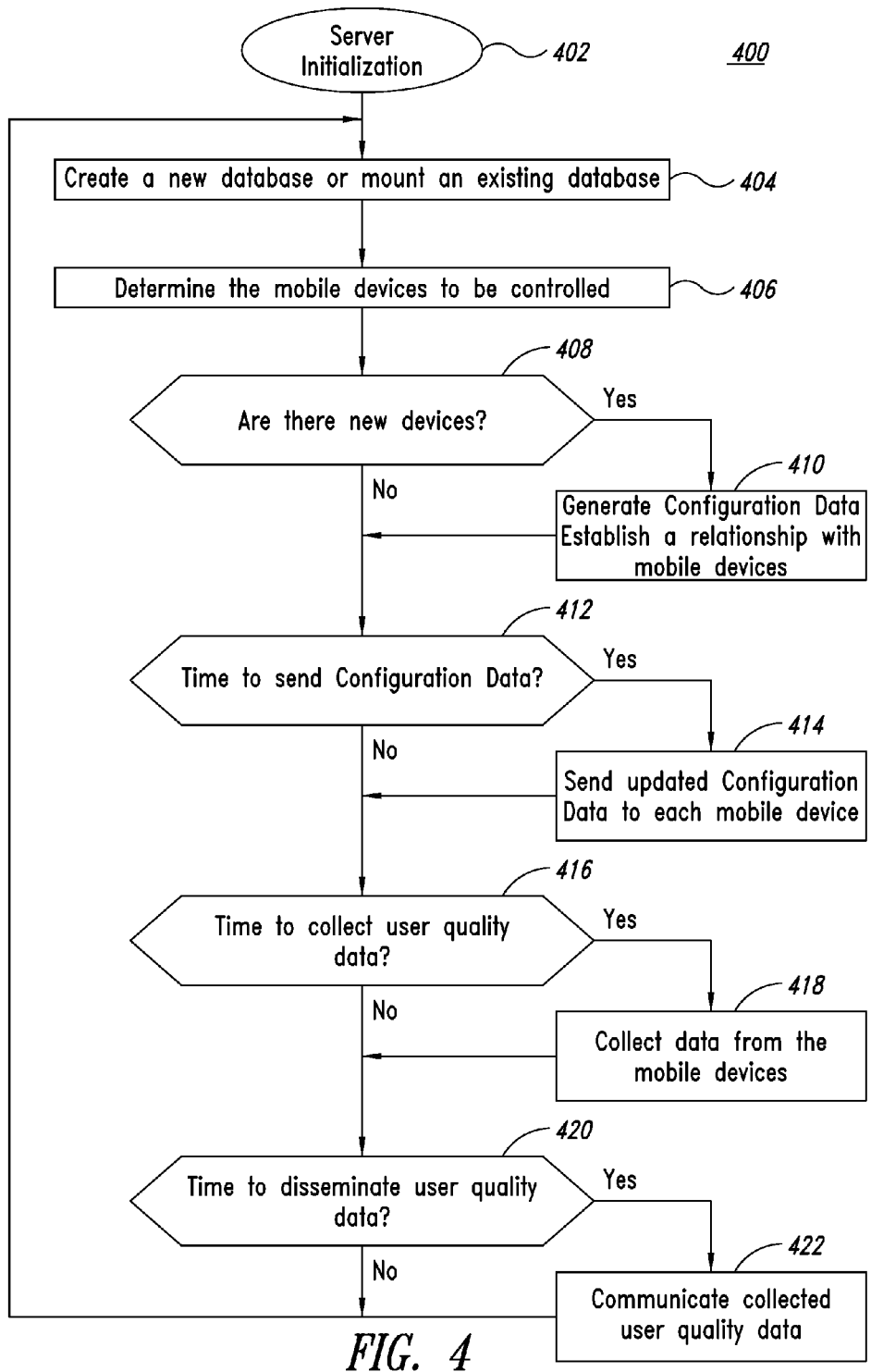
FIG. 4 is a flowchart illustrating one embodiment of a process used by the computing server.

FIG. 4 is a flowchart 400 illustrating processes that may be used by embodiments of the server used for directing the collection and retrieval of network performance data. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 4, the process 400 is ongoing with operation of the server 120, and is illustrated as starting at 402 when server 120 initializes. At 404, operation of server 120 begins by creating a new database or mounting an existing database. Next, at 406, the number and identity of mobile devices 118*a-d* already in the network performance measurement system 110 are determined. If there are new mobile devices 118*a-d* in the network performance measurement system 110 at 408, then configuration data (e.g., a configuration file) is created and a relationship is established between server 120 and each new mobile device 118*a-d* at 410.

At 412, server 120 determines if it is time to send configuration data to mobile devices 118*a-d* or if mobile devices have requested new configuration data, and if so, the updated configuration data is sent to the mobile devices 118*a-d*. Next, at 416, server 120 determines if data is to be collected from mobile devices 118*a-d*, and if so, the data is collected at 418.

Finally, server 120 determines if the collected user quality data measurements are to be disseminated at 420. If the data is to be disseminated, the collected data is communicated to another server or application at 422. The process 400 does not typically end, but instead, cyclically returns to the new devices interrogation operation at 408.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for collecting and processing wireless network user quality data, the method comprising:
   identifying a mobile computing device operating within a wireless network, the mobile computing device executing a wireless network user quality data collection software program, the mobile computing device provisioned for typical operation on a wireless communication network;
   forming a unique user location profile, the unique user location profile formed from a combination of:
      a unique identifier of the mobile computing device,
      a recognized geographic pattern of operation of the mobile computing device, the recognized geographic pattern repeated at least twice, and
      a recognized time pattern of operation of the mobile computing device, the recognized time pattern repeated at least twice;
   modifying the unique user location profile to change the frequency of data collection based on an age of data previously collected;
   choosing at least one configuration datum based on information in the user location profile, the configuration datum including a cell tower list;
   communicating the at least one configuration datum to the mobile computing device, the configuration datum directing the mobile computing device to perform a wireless network user quality data collection operation if the mobile computing device is associated with a cell tower listed on the cell tower list; and
   receiving at least one wireless network user quality data measurement from the mobile computing device.

2. The method for collecting and processing wireless network user quality data according to claim 1, wherein the configuration datum is chosen by predicting that the mobile computing device will be in a particular geographic area within a particular window of time.

3. The method for collecting and processing wireless network user quality data according to claim 1, the method further comprising:
   identifying a plurality of mobile computing devices operating within the wireless network, the mobile computing devices each executing the wireless network user quality data collection software program;
   grouping the plurality of mobile computing devices according to a geographic area where the plurality of mobile computing devices is operating;
   communicating a first set of configuration data to a first subset of the plurality of mobile computing devices;
   recognizing data collection in an overlapping area; and
   communicating a second set of configuration data to a second subset of the plurality of mobile computing devices, the second set of configuration data formed on the basis of the overlapping area, wherein the first and second sets of configuration data direct the respective first and second subsets of the plurality of mobile computing devices to perform wireless network user quality data collection operations at different times.

4. The method for collecting and processing wireless network user quality data according to claim 3, wherein the grouping of the plurality of mobile computing devices is performed when each of the plurality of mobile computing devices is operating in association with a particular cell tower.

5. The method for collecting and processing wireless network user quality data according to claim 1, wherein the at least one configuration datum is stored in a configuration file and the configuration file is communicated to the mobile computing device according to a messaging protocol wherein the configuration file is a payload of a single message of the messaging protocol.

6. The method for collecting and processing wireless network user quality data according to claim 1 wherein the configuration datum is chosen from a set of configuration data points including network signal strength, data transfer speed, data latency, and a measurement of dropped calls.

7. The method for collecting and processing wireless network user quality data according to claim 1, wherein communicating the at least one configuration datum to the mobile computing device involves sending a single packet having the at least one configuration datum to the mobile computing device and wherein the configuration datum includes a software instruction to be executed by the mobile computing device.

8. The method for collecting and processing wireless network user quality data according to claim 1, the method further comprising:
   receiving a plurality of wireless network user quality data measurements from the mobile computing device;
   filtering the plurality of wireless network user quality data measurements; and
   storing the plurality of wireless network user quality data measurements.

9. The method for collecting and processing wireless network user quality data according to claim 8, the method further comprising:

parsing the plurality of wireless network user quality data measurements according to a set of configuration data points including network signal strength, data transfer speed, data latency, and a measurement of dropped calls.

10. The method for collecting and processing wireless network user quality data according to claim 8, the method further comprising:
receiving a request for at least some of the stored plurality of wireless network user quality data measurements from a remote computing device; and
communicating, according to the request, the at least some of the stored plurality of wireless network user quality data measurements to the remote computing device.

11. A non-transitory computer readable medium comprising content that configures a mobile computing device to perform the steps of claim 1.

12. A computing server, comprising:
a central processing unit (CPU);
a communication transceiver;
a memory storing software, the software executable by the CPU and operable to:
identify a mobile computing device operating within a wireless network, the mobile computing device executing a data collection software program, the mobile computing device provisioned for typical operation on a wireless communication network;
form a unique user location profile, the unique user location profile formed from a combination of:
a unique identifier of the mobile computing device,
a recognized geographic pattern of operation of the mobile computing device, the recognized geographic pattern repeated at least twice, and
a recognized time pattern of operation of the mobile computing device, the recognized time pattern repeated at least twice;
modify the unique user location profile to change the frequency of data collection based on a characteristic of data previously collected;
choose a wireless network user quality data collection operation based on information in the user location profile;
direct, via the communication transceiver, the mobile computing device to perform the wireless network user quality data collection operation; and
parse received wireless network user quality data from the mobile computing device into a user quality data point.

13. The computing server of claim 12, further comprising:
a second memory configured to store configuration information related to a plurality of mobile computing devices; and
a third memory configured to store a database, the database configured to store the user quality data point.

14. The computing server of claim 12 wherein the software executable by the CPU is further operable to send a configuration file to the mobile computing device, the configuration file having information to direct the wireless network user quality data collection operation.

15. The computing server of claim 14 wherein the configuration file sent to the mobile computing device has information to direct the wireless network user quality data collection operation to be performed during a particular time window.

16. The computing server of claim 14 wherein the configuration file sent to the mobile computing device has information to direct the wireless network user quality data collection operation to be performed when the mobile device is operating in a particular geographic area.

17. A system for collecting wireless network user quality data, the system comprising:
a computing server configured to direct wireless network user quality data collection operations to a mobile device, the mobile device provisioned for typical operation on a wireless communication network;
a memory associated with the computing server, the memory configured to store a software program, the software program capable of instructing the server to:
form a unique user location profile, the unique user location profile formed from a combination of:
a unique identifier of the mobile device,
a recognized geographic pattern of operation of the mobile device, the recognized geographic pattern repeated at least twice,
a recognized time pattern of operation of the mobile device, the recognized time pattern repeated at least twice, and
a prediction that the mobile device will again be in proximity of the recognized geographic pattern at a future time;
modify the unique user location profile to change the frequency of data collection based on a characteristic of data previously collected;
choose at least two wireless network user quality data collection operations based on information in the user location profile;
communicate a direction to the mobile device to perform the at least two wireless network user quality data collection operations;
receive information from the mobile computing device indicating that at least one of the at least two wireless network user quality data collection operations will be ignored;
buffer wireless network user quality data collected according to the direction;
parse the collected wireless network user quality data.

18. The system for collecting wireless network user quality data according to claim 17, the system further comprising:
a second memory associated with the computing server, the second memory configured to store a plurality of configuration files, the plurality of configuration files formed to direct user quality data collection operations on a plurality of mobile devices; and
a third memory associated with the computing server, the third memory configured to store a plurality of user quality data measurements collected by the plurality of mobile devices.

19. The system for collecting wireless network user quality data according to claim 17, the system further comprising:
a transceiver operable to receive requests for user quality data information from a remote computer and further operable to communicate the user quality data information to the remote computer.

20. The method for collecting and processing wireless network user quality data according to claim 1, wherein the configuration datum directs the mobile computing device to perform the wireless network user quality data collection operation if the mobile computing device moves more than a predetermined amount.

* * * * *